US006729660B2

(12) United States Patent
Musser

(10) Patent No.: US 6,729,660 B2
(45) Date of Patent: May 4, 2004

(54) ADJUSTABLE BASE UNIT FOR ANGULARLY ADJUSTING MOUNTING DISPOSITION OF SILO FILL TUBE

(75) Inventor: Kenneth D. Musser, Mount Joy, PA (US)

(73) Assignee: Lancaster Level-Flo, Inc., Mount Joy, PA (US)

( * ) Notice: Subject to any disclaimer, the term of this patent is extended or adjusted under 35 U.S.C. 154(b) by 0 days.

(21) Appl. No.: 09/883,600

(22) Filed: Jun. 18, 2001

(65) Prior Publication Data

US 2002/0051683 A1 May 2, 2002

Related U.S. Application Data

(60) Provisional application No. 60/244,219, filed on Oct. 30, 2000.

(51) Int. Cl.[7] .................................................. F16L 23/00
(52) U.S. Cl. ....................... 285/412; 285/368; 285/414; 285/223; 285/184; 406/196; 406/182
(58) Field of Search ................................ 285/363, 368, 285/414, 412, 221, 223, 184, 185; 406/181–183, 191–196

(56) References Cited

U.S. PATENT DOCUMENTS

| | | | |
|---|---|---|---|
| 731,159 A | * | 6/1903 | Boardman et al. .......... 285/261 |
| 2,650,136 A | | 8/1953 | Raleigh |
| 2,741,512 A | | 4/1956 | Stott et al |
| 3,321,252 A | | 5/1967 | Dreier |
| 3,554,610 A | | 1/1971 | Gelle |
| 3,570,688 A | | 3/1971 | Ryder et al. |
| 3,834,768 A | | 9/1974 | Stoltzfus et al. |
| 4,023,688 A | | 5/1977 | Freeman et al. |
| 4,256,419 A | | 3/1981 | Haan |
| 4,489,962 A | * | 12/1984 | Caumont et al. ........... 285/263 |
| 5,653,482 A | * | 8/1997 | Ficchi, Jr. ................... 285/405 |
| 6,279,969 B1 | * | 8/2001 | DeKock et al. ............. 285/405 |

* cited by examiner

*Primary Examiner*—Lynne H. Browne
*Assistant Examiner*—G. M. Collins
(74) *Attorney, Agent, or Firm*—Michael R. Swartz; John R. Flanagan

(57) ABSTRACT

An adjustable base unit includes a pair of upper and lower frameworks, a connection sleeve attached to the lower framework and having opposite end portions for extending into and providing flow communication through the unit and between an upper fill tube and a lower blower pipe of a silo filling apparatus, and elements for adjustably interconnecting and spacing apart the upper and lower frameworks with respect to one another. When the unit is interposed between the fill tube and blower pipe and the upper and lower frameworks are respectively detachably attached to the fill tube, connection sleeve and blower pipe, the upper framework can be angularly tilted by adjusting selected ones of the interconnecting elements in any one of several different orientations relative to the lower framework so as to correspondingly angularly adjust the mounting disposition of the fill tube on the blower pipe and thereby the position of the fill tube within the silo.

21 Claims, 6 Drawing Sheets

ADJUSTABLE BASE UNIT FOR ANGULARLY ADJUSTING MOUNTING DISPOSITION OF SILO FILL TUBE

This utility patent application claims the benefit of provisional application No. 60/244,219 filed Oct. 30, 2000.

BACKGROUND OF THE INVENTION

1. Field of the Invention

The present invention generally relates to silo filling apparatus and, more particularly, is concerned with an adjustable base unit for angularly adjusting the mounting disposition of a silo fill tube on a blower pipe of a silo filling apparatus.

2. Description of the Prior Art

A farm silo is used for the storage of livestock feed materials, such as ensilage or silage. A typical silo can be twelve to thirty feet in diameter and from forty to one-hundred feet in height. Conventionally, the silo is of a cylindrical configuration and has a vertically-extending continuous side wall. The side wall, being made of concrete or the like, is supported at a lower end on a base and extends upright therefrom to an opposite upper end enclosed with a dome-shaped roof structure, commonly made of sheet metal.

For filling the silo, it has been a common practice for many years to provide a silo filling apparatus which includes a blower pipe attached to and extending along the exterior of the side wall of the silo from its lower end to its upper end. The blower pipe extends adjacent to a ladder framework that is also attached to the exterior of the side wall of the silo and provides means for a man to climb up along the outside of the silo to the top thereof. The blower pipe is normally of sheet metal construction and circular in cross-section. A lower infeed end of the blower pipe is connected to a silage blower into which ensilage is unloaded from a wagon.

The silo filling apparatus also includes a fill conduit or tube mounted at an outer inlet end thereof to an upper discharge end of the blower pipe. The fill tube is rectangular in cross-section of a generally curved or arcuate configuration and commonly referred to in the industry as a "gooseneck". The fill tube is disposed at the top of the silo, extending from the upper discharge end of the blower pipe at the exterior of the silo, through an opening in the silo roof, and arching inwardly to an inner discharge end positioned approximately centrally over the top of an interior storage chamber of the silo. The fill tube at its outer inlet end is typically connected in a fixed position to the upper discharge end of the blower pipe and supported therefrom in a cantilevered fashion.

Also, typically, the silo filling apparatus includes a relatively short straight pipe section attached to the inner discharge end of the fill tube. The pipe section is commonly referred to as a "downspout" for directing the ensilage down toward the center of the base of the silo. The downspout is useful to drop or discharge the ensilage in a less air turbulent operation so as to assist in the discharge of the ensilage to a desired location within the silo.

Thus, in the silo filling operation, ensilage is blown up along the exterior of the silo through the blower pipe, up and across the interior of the top of the silo through the fill tube, and then down through the downspout toward the center of the base of the silo. For various reasons during the silo filling operation it is desirable to be able to control the position of the inner discharge end of the fill tube so as to be able to "aim" the discharge flow of ensilage from the downspout to and toward a specific location within the silo. There are many different designs and constructions of fill tubes and many different attempts have been made to control the positioning of its inner discharge end, however, with varying degrees of success.

Consequently, a need still remains for an innovation which will provide an effective solution to the aforementioned problem without introducing any new problems in place thereof.

SUMMARY OF THE INVENTION

The present invention provides an adjustable base unit designed to satisfy the aforementioned need. The adjustable base unit of the present invention, which is relatively simple and inexpensive in construction, is interposed between the upper discharge end of the blower pipe and the outer inlet end of the fill tube. The adjustable base unit is adapted for angularly adjusting the mounting disposition of the fill pipe on the blower pipe such that the fill tube can be pivoted relative to the blower pipe so as to place the fill tube at various angular dispositions such that its inner discharge end is thereby correspondingly moved to selected desired discharge locations at the top of the interior storage chamber of the silo. The adjustable base unit can be retrofitted to existing silo filling apparatus as well as provided as part of newly-installed silo filling apparatus.

Accordingly, the present invention is directed to an adjustable base unit for angularly adjusting the mounting disposition of a fill tube on a blower pipe of a silo filling apparatus. The adjustable base unit comprises: (a) an upper framework defining an upper opening of the unit and adapted to be detachably attached to an outer inlet end of the fill tube of the silo filling apparatus such that the upper opening is disposed adjacent to and generally aligned with the outer inlet end of the fill tube; (b) a lower framework defining a lower opening of the unit and adapted to be detachably attached to an upper discharge end of the blower pipe of the silo filling apparatus such that the lower opening is disposed adjacent to and generally aligned with the upper discharge end of the blower pipe; (c) a connection sleeve fixedly attached to the lower framework and adapted to extend between and through the upper and lower openings of the upper and lower frameworks, the connection sleeve having an upper end portion adapted to be inserted into the outer inlet end of the fill tube and a lower end portion adapted to be attached to the upper discharge end of the blower pipe such that the connection sleeve provides flow communication between respective passageways of the blower pipe and fill tube for passage of ensilage from the blower pipe to the fill tube; and (d) a plurality of elements adjustably interconnecting the upper and lower frameworks to one another in a spaced apart relationship from one another such that by adjusting selected ones of the interconnecting elements the upper framework can be angularly tilted in any one of several different orientations relative to the lower framework and the connection sleeve attached therewith so as to correspondingly angularly adjust the mounting disposition of the fill tube on the blower pipe and thereby the position of the fill tube within the silo.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
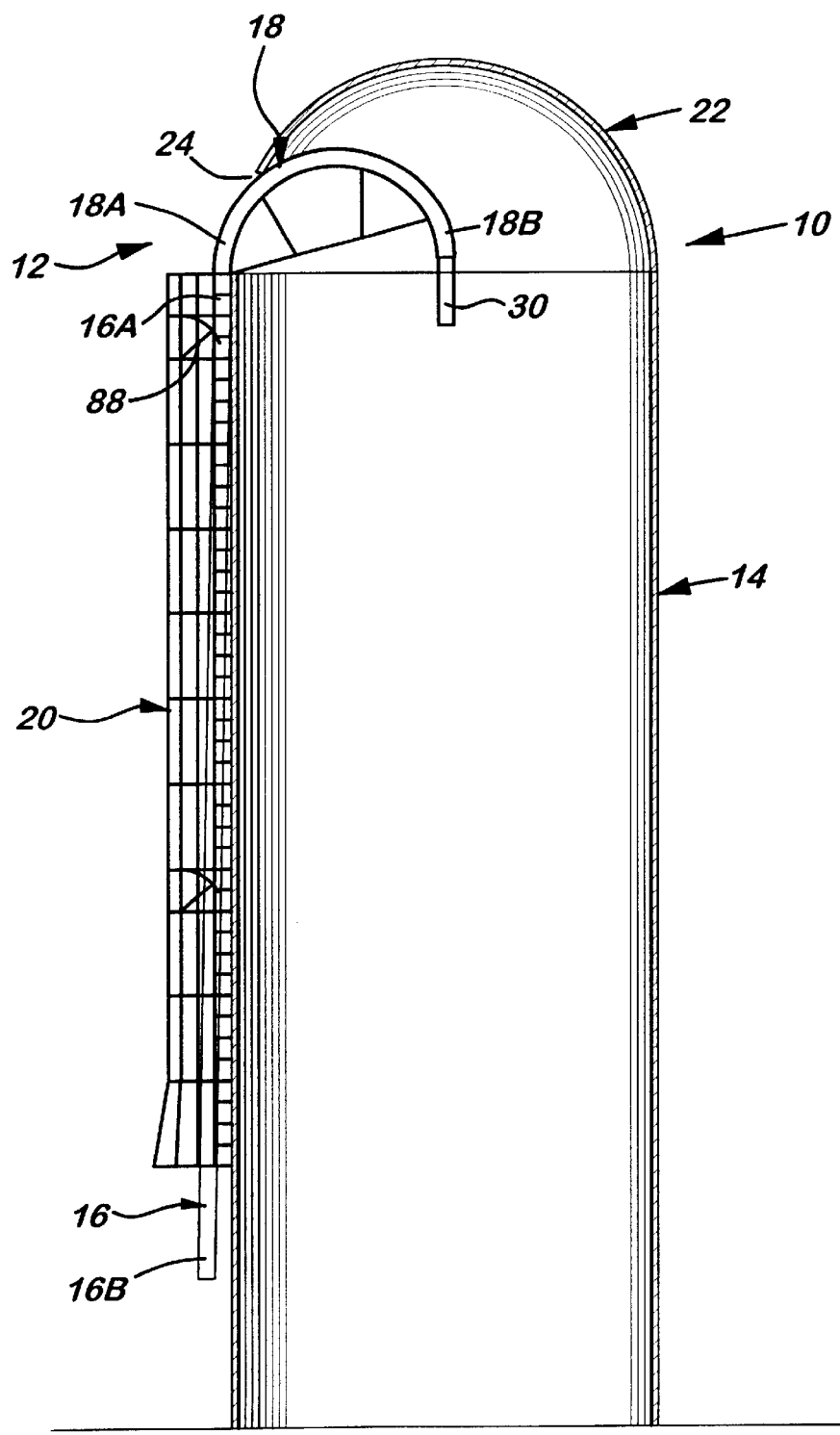
FIG. 1 is a side elevational view of a conventional silo having attached at the exterior thereof a blower pipe of a prior art silo filling apparatus and a fill tube of the silo filling apparatus mounted in a cantilevered fashion to the blower pipe and extending into the silo through an opening in the silo roof.

In the following description, like reference characters designate like or corresponding parts throughout the several views of the drawings. Also in the following description, it is to be understood that such terms as "forward", "rearward", "upwardly", "downwardly", and the like are meant to be words of convenience and are not to be construed as limiting terms.

Referring to the drawings and particularly to FIG. 1, there is illustrated a conventional silo 10 having a prior art silo filling apparatus, generally designated 12, attached on a continuous vertically-extending cylindrical side wall 14 of the silo 10. The silo filling apparatus 10 includes a blower pipe 16 and a fill tube 18. Adjacent to the blower pipe 16 and attached to the side wall 14 of the silo 10 is a conventional ladder framework structure 20. At its upper end, the silo 10 is enclosed by a roof 22 having a side opening 24 therein. The fill tube 18 at an outer inlet end 18A thereof has a generally rectangular-shaped mounting frame 26 connecting the fill tube 18 in flow communication with the blower pipe 16 and mounting the fill tube 18 in a cantilevered fashion to an upper discharge end 16A of the blower pipe 16 such that the fill tube 18 extends in a curved configuration, inwardly through the opening 24 in the roof 22, into the silo 10 to an inner discharge end 18B disposed at a generally central location at the top of an interior storage chamber 28 of the silo. The fill tube 18 has a downspout 30 attached to its inner discharge end 18B from which ensilage blown by a silage blower unit (not shown) into an lower infeed end 16B of the blower pipe 16 and upwardly to and through the fill tube 18 is discharged into the silo storage chamber 30.

Figure 2:
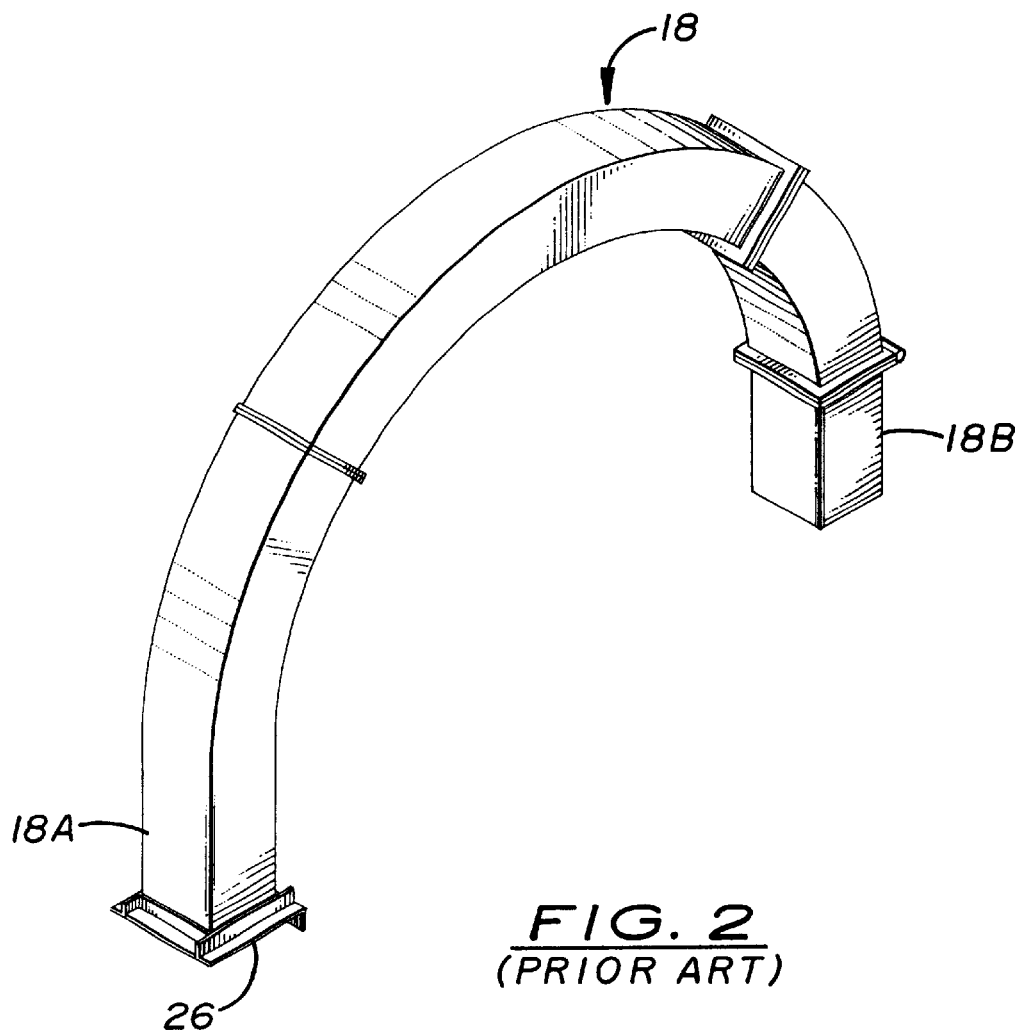
FIG. 2 is an enlarged perspective view of the fill tube of FIG. 1.

As best seen in FIG. 2, the fill tube 18 is tubular and has a generally rectangular cross-sectional configuration and a sheet metal construction. The fill tube 18 is preferably formed of several sections suitably connected together to form a one-piece arcuate-shaped structure spanning from its outer inlet end 18A to its inner discharge end 18B to which is attached the discharge downspout 30. The mounting bracket 26 is attached to the outer inlet end 18A of the fill tube 18 for mounting to the upper discharge end 16A of the blower pipe 16.

Figure 3:
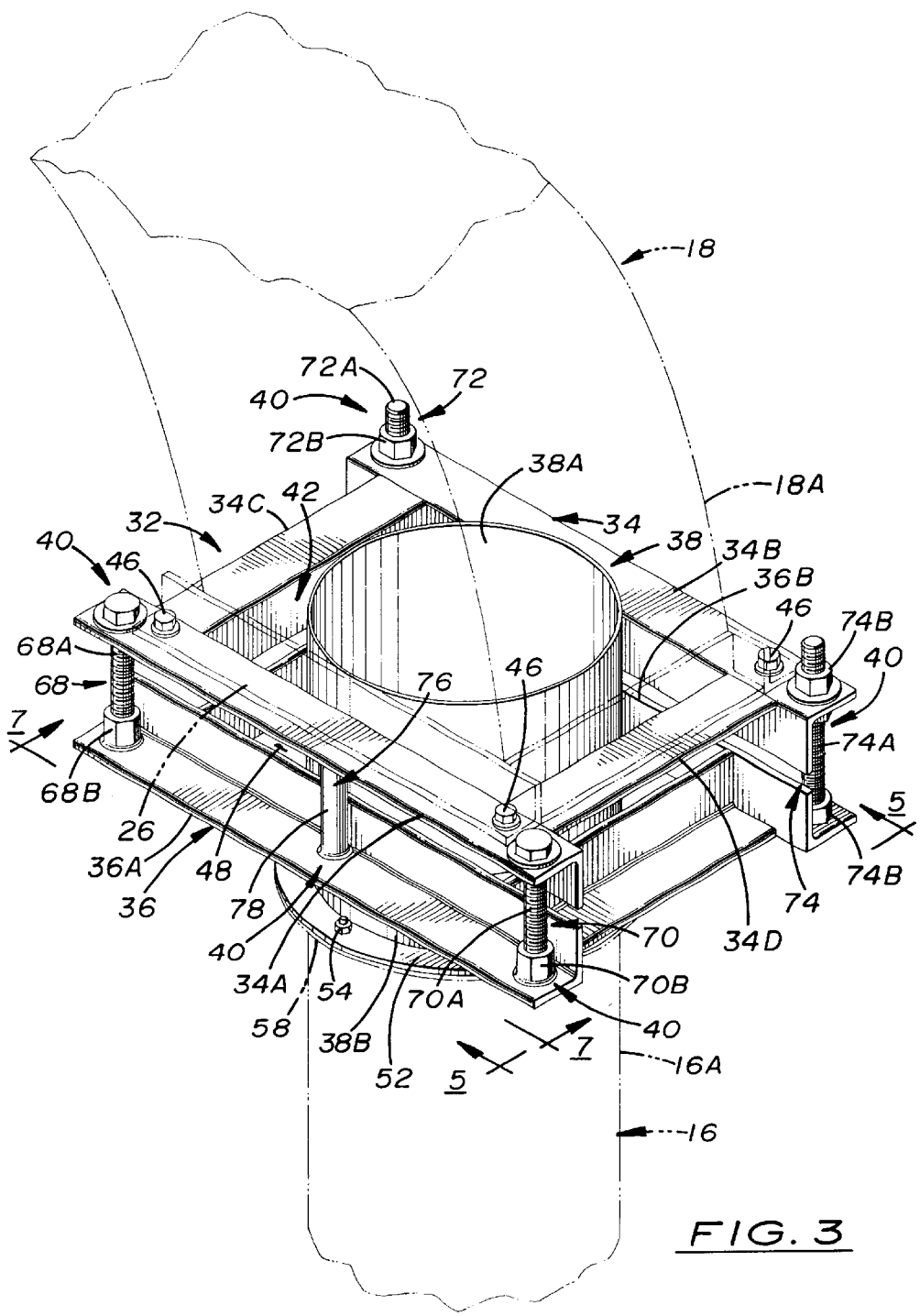
FIG. 3 is an assembled front perspective view of an adjustable base unit of the present invention showing an upper framework of the unit at a centered orientation relative to a lower framework of the unit and the unit interposed between an upper discharge end of the blower pipe and an outer inlet end of the fill tube being shown in phantom with the fill tube curving away from the plane of the drawing sheet towards the left shoulder of the viewer.
Figure 4:
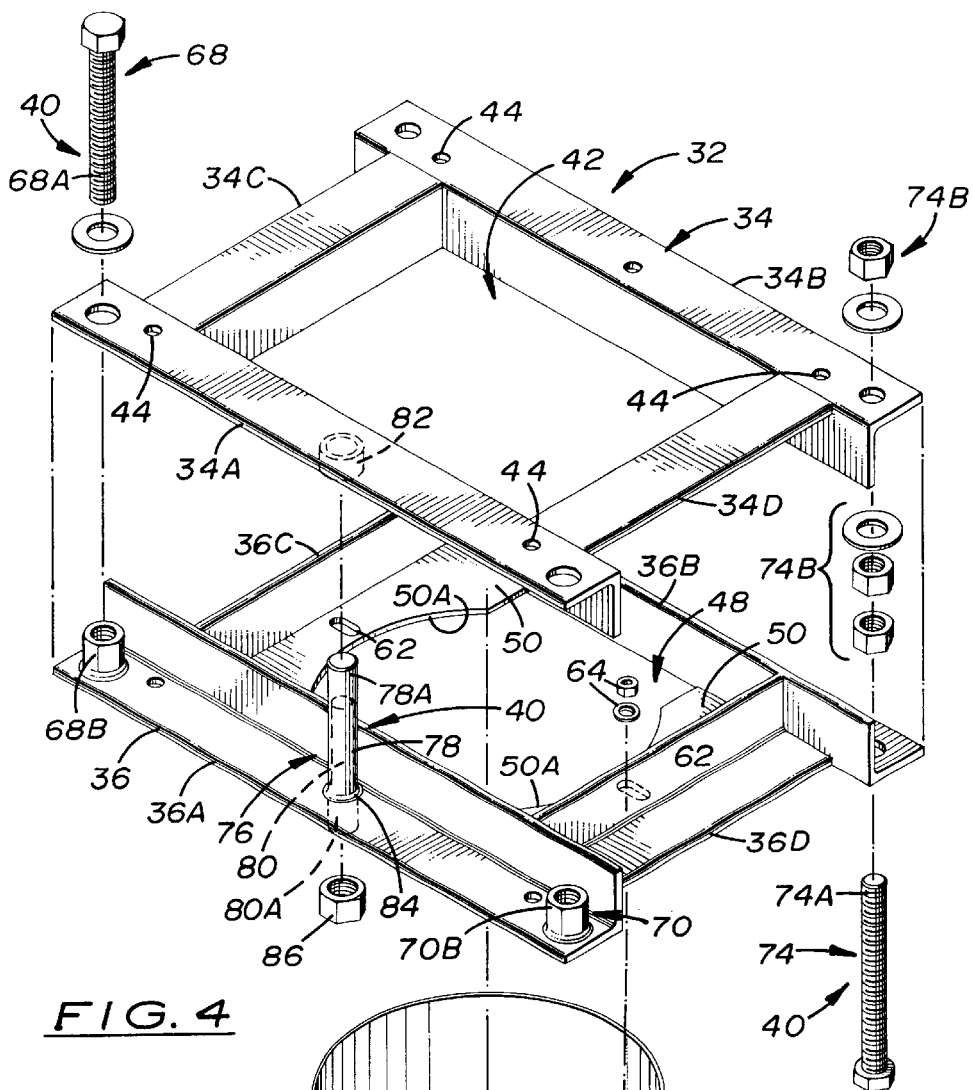
FIG. 4 is an exploded perspective view of the unit of FIG. 3.
Figure 4:
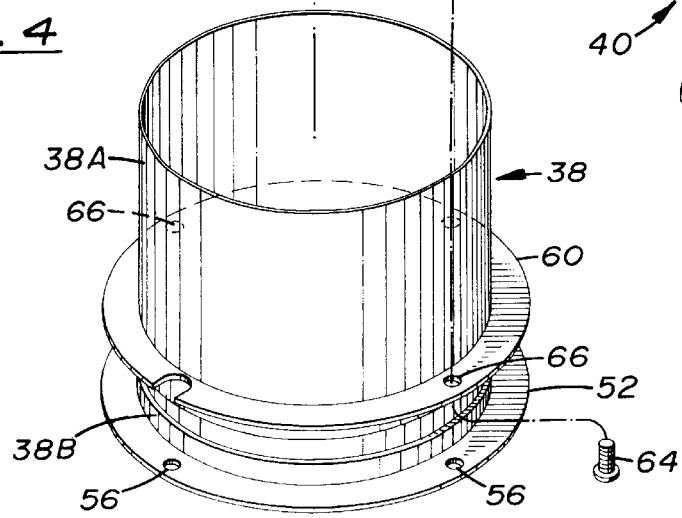

Referring now to FIGS. 3 and 4, there is illustrated an adjustable base unit, generally designated 32, adapted to be interposed between and attached to the upper discharge end 16A of the blower pipe 16 and the outer inlet end 18A of the fill tube 18 for angularly adjusting the mounting disposition of the fill tube 18 on the blower pipe 16. The adjustable base unit 32 basically includes an upper framework 34, a lower framework 36, a connection sleeve 38, and means 40 for interconnecting the upper and lower frameworks 34, 36 together in a spaced apart relationship and being operable to adjust the vertical spacing therebetween and thus the position of the upper framework 34 relative to the lower framework 36.

More particularly, the upper framework 34 of the unit 32 includes four frame members, such being front and rear frame members 34A, 34B and two opposite side frame members 34C, 34D extending between and rigidly connected in a suitable manner to the front and rear frame members 34A, 34B so as to provide the upper framework 34 with a rectangular configuration and to define an upper opening 42 of the unit 32 through the upper framework 34. Holes 44 spaced apart from one another are defined in the front and rear frame member 34A, 34B of the upper framework 34 adjacent to the opposite ends of the front and rear frame members 34A, 34B. Fasteners 46 are inserted through the holes 44 of the upper framework 34 and through holes (not shown) in the mounting bracket 26 on the outer inlet end 18A of the fill tube 18 so as to detachably attach the upper framework 34 to the mounting bracket 26 on the fill tube 18 such that the upper framework 34 extends about the outer inlet end 18A of the fill tube 18 and the upper opening 42 of the upper framework 34 is disposed adjacent to and generally aligned with the outer inlet end 18A of the fill tube 18.

The lower framework 36 of the unit 32 includes four frame members, such being front and rear frame members 36A, 36B and two opposite side frame members 36C, 36D extending between and rigidly connected in a suitable manner to the front and rear frame members 36A, 36B so as to provide the lower framework 36 with a rectangular configuration and define a lower opening 48 of the unit 32 through the lower framework 36. The lower framework 36 also has a pair of brackets 50 each connected to and extending between the front and rear frame members 36A, 36B and disposed along and connected to a respective one of the opposite side frame members 36C, 36D. Inner edges 50A of the brackets 50 which face toward one another have arcuate configurations.

The connection sleeve 38 of the unit 32 is attached to the lower framework 36 and adapted to extend between and through the upper and lower openings 42, 48 of the upper and lower frameworks 34, 36. The connection sleeve 38 has an upper end portion 38A adapted to be inserted into the outer inlet end 18A of the fill tube 18 and a lower end portion 38B adapted to be attached to the upper discharge end 16A of the blower pipe 16 such that the connection sleeve 38 provides flow communication between respective passageways of the blower pipe 16 and fill tube 18 for passage of ensilage from the blower pipe 16 to the fill tube 18.

For attaching the lower end portion 38B of the connection sleeve 38 to the upper discharge end 16A of the blower pipe 16, the connection sleeve 38 has a lower annular flange 52 attached about and extending outwardly from the lower end portion 38B of the connection sleeve 38. Fasteners 54 are inserted through holes 56 defined in the lower annular flange 52 and circumferentially spaced from one another and holes (not shown) defined in an annular flange 58 on the upper discharge end 16A of the blower pipe 16 so as to detachably attach the connection sleeve 38 to the upper discharge end 16A of the blower pipe 16.

For also attaching the lower end portion 38B of the connection sleeve 38 to the lower framework 36, the connection sleeve 38 has an upper annular flange 60 spaced above the lower annular flange 52 and attached about and extending outwardly from the lower end portion 38B of the connection sleeve 38. Slots 62 are defined through the brackets 50 midway between the front and rear frame members 36A, 36B and adjacent to the arcuate-shaped inner edges 48A, 50A of the brackets 50. Fasteners 64 are inserted through the slots 62 and also through complementary holes 66 defined in the upper annular flange 60 of the connection sleeve 38 so as to detachably attach the connection sleeve 38 to the lower framework 36 of the unit 32 such that the lower framework 36 extends about the lower end portion 38B of the connection sleeve 38 and the lower opening 48 of the lower framework 36 is disposed adjacent to and generally aligned with the upper discharge end 16A of the blower pipe 16.

The cylindrical configuration of the connection sleeve 38 is complementary to the arcuate configurations of the inner edges 50A of the brackets 50 such that the upper end portion 38A of the connection sleeve 38 extends closely adjacent to and upwardly between the respective arcuate-shaped inner edges 50A of the brackets 50 and thus upwardly through the respective lower opening 48 of the lower framework 36, the upper opening 42 of the upper framework 34 and into the outer inlet end 18A of the fill tube 18. In such manner, the connection sleeve 38 provides the flow communication between the respective passageways of the blower pipe 16 and the fill tube 18 for passage of ensilage from the blower pipe 16 to the fill tube 18.

The interconnecting and adjusting means 40 of the unit 32 includes a plurality of elements adjustably interconnecting the upper and lower frameworks 34, 36 to one another in the spaced apart relationship from one another such that the upper framework 34 can be angularly tilted in any one of several, preferably four, different orientations relative to the lower framework 36 and the connection sleeve 38 attached therewith so as to correspondingly angularly adjust the mounting disposition of the fill tube 18 on the blower pipe 16 and thereby the position of the fill tube 18 within the silo. The elements of the means 40 include four adjustment elements 68, 70, 72, 74 located at four corresponding corners of the upper and lower frameworks 34, 36 of the unit 32 and a socket assembly 76 located between the front frame members 34A, 36A of the upper and lower frameworks 34, 36. More particularly, the four adjustment elements 68–74 are in the form of threaded studs 68A–74A and retaining nuts 68B–74B into and from which the studs 68A–74A can be threaded so as to change the spacing between the upper and lower frameworks 34, 36. The socket assembly 76 includes a short length of pipe 78 with a bolt 80 tightly fitted therein and extending therefrom to a lower end portion 80A and an annular collar 82 adapted to receive an upper end portion 78A of the pipe 78. The lower end portion 80A of the bolt 80 is inserted through a hole 84 in the midsection of the front frame member 36A of the lower framework 36 and securely fastened thereto by a nut 86 threaded tightly on the lower end portion 80A. The annular collar 82 is secured to the front frame member 34A of the upper framework 34 and seated over the upper end portion 78A of the pipe 78. The primary purpose of the socket assembly 76 is to relieve some of the stress load placed on the four adjustment elements 68–74 of the interconnecting means 40.

Referring to FIGS. 5–8, there is illustrated the four different orientations in which the upper framework 34 can be angularly tilted relative to the lower framework 36 (and the connection sleeve 38 attached therewith) and away from their centered orientation shown in FIG. 3 so as to correspondingly angularly adjust the mounting disposition of the fill tube 18 on the blower pipe 16 and thereby the position of the fill tube 18 within the silo. The four different orientations that the upper framework 34 can be angularly tilted relative to the lower framework 34 include forwardly, rearwardly, rightwardly and leftwardly tilted orientations relative to the centered orientation of the upper framework 34 relative to the lower framework 36.

Figure 5:
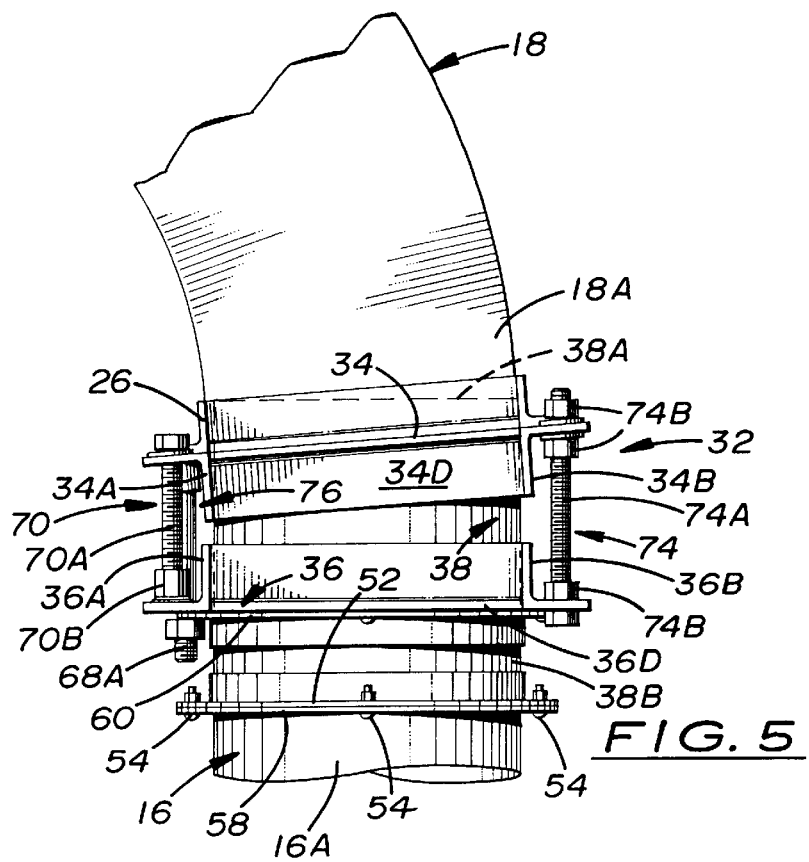
FIG. 5 is a side elevational view of the unit as seen along line 5—5 of FIG. 3 but now showing the upper framework of the unit adjusted to a forwardly tilted orientation relative to the lower framework of the unit so that the fill tube extends further inwardly into the silo than when the upper and lower frameworks are in their centered orientation of FIG. 3.

FIG. 5 shows the upper framework 34 of the unit 32 adjusted to a forwardly tilted orientation relative to the lower framework 36 of the unit 32 so that the fill tube 18 extends further inwardly into the silo 10 than when the upper and lower frameworks 34, 36 are in their centered orientation of FIG. 3. To adjust the upper framework 34 to the forwardly tilted orientation of FIG. 5, the adjustment elements 72, 74 between the rear frame members 34B, 36B of the upper and lower frameworks 34, 36 are adjusted so as to space the rear frame members 34B, 36B further apart compared to their centered orientation of FIG. 3. The adjustment elements 68, 70 on front frame members 34A, 36A are merely loosened sufficiently to permit the upper framework 34 to pivot at the annular collar 82 about the upper end portion 78A of the pipe 78 of the socket assembly 76 and away from the lower framework 36 as the adjustment elements 72, 74 are adjusted to increase the spacing of the upper framework 34 from the lower framework 36 between the rear frame members 34B, 36B thereof.

Figure 6:
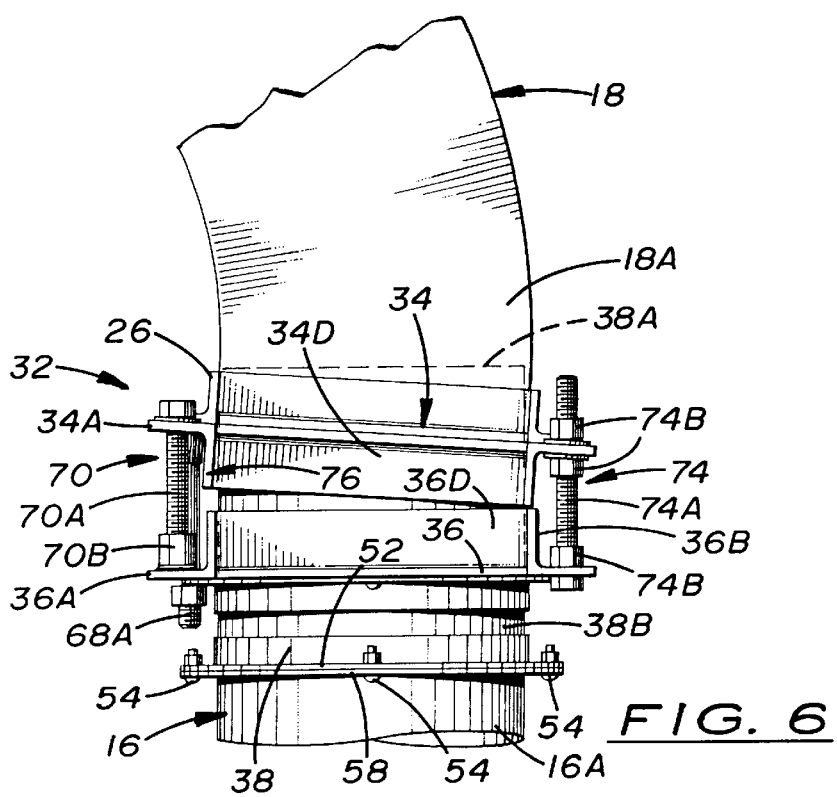
FIG. 6 is another side elevational view of the unit similar to that of FIG. 5 but now showing the upper framework of the unit adjusted to a rearwardly tilted orientation relative to the lower framework of the unit so that the fill tube extends further outwardly from the silo than when the upper and lower frameworks are in their centered orientation of FIG. 3.

FIG. 6 shows the upper framework 34 of the unit 32 adjusted to a rearwardly tilted orientation relative to the lower framework 36 of the unit 32 so that the fill tube 18 extends further outwardly from the silo 10 than when the upper and lower frameworks 34, 36 are in their centered orientation of FIG. 3. To adjust the upper framework 34 to the rearwardly tilted orientation of FIG. 6, the adjustment elements 72, 74 between the rear frame members 34B, 36B of the upper and lower frameworks 34, 36 are adjusted so as to space the rear frame members 34B, 36B closer together compared to their centered orientation of FIG. 3. Again, the adjustment elements 68 and 70 on front frame members 34A, 36A are merely loosened sufficiently to permit the upper framework 34 to pivot at the annular collar 82 about the upper end portion 78A of the pipe 78 of the socket assembly 76 and toward the lower framework 36 as the adjustment elements 72, 74 are adjusted to decrease the spacing of the upper framework 34 from the lower framework 36 between the rear frame members 34B, 36B thereof.

Figure 7:
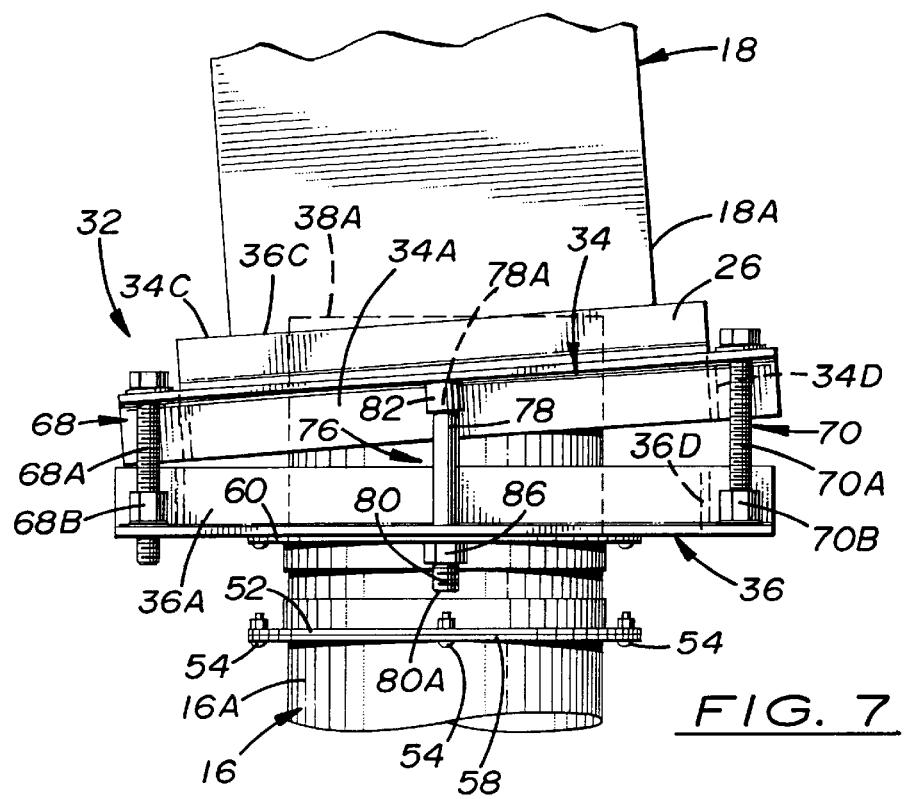
FIG. 7 is a front elevational view of the unit as seen along line 7—7 of FIG. 3 but now showing the upper framework of the unit adjusted to a leftwardly tilted orientation relative to the lower framework of the unit so that the fill tube is canted to a left-of-center disposition.

FIG. 7 shows the upper framework 34 of the unit 32 adjusted to a leftwardly tilted orientation relative to the lower framework 36 of the unit 32 so that the fill tube 18 is canted to a left-of-center disposition. To adjust the upper framework 34 to the leftwardly tilted orientation of FIG. 7, the adjustment elements 68, 72 (with only the adjustment element 68 being seen in FIG. 7) between the front frame members 34A, 36A and adjacent to the left side frame members 34C, 34C of the upper and lower frameworks 34, 36 are adjusted so as to space the left side frame members 34C, 36C closer together compared to the centered orientation of the upper and lower frameworks 34, 36 in FIG. 3 and the adjustment elements 70, 74 (with only the adjustment element 70 being seen in FIG. 7) between the front frame members 34A, 36A and adjacent to the right side frame members 34D, 36D of the upper and lower frameworks 34, 36 are adjusted so as to space the right side frame members 34D, 36D farther apart compared to the centered orientation of the upper and lower frameworks 34, 36 in FIG. 3.

Figure 8:
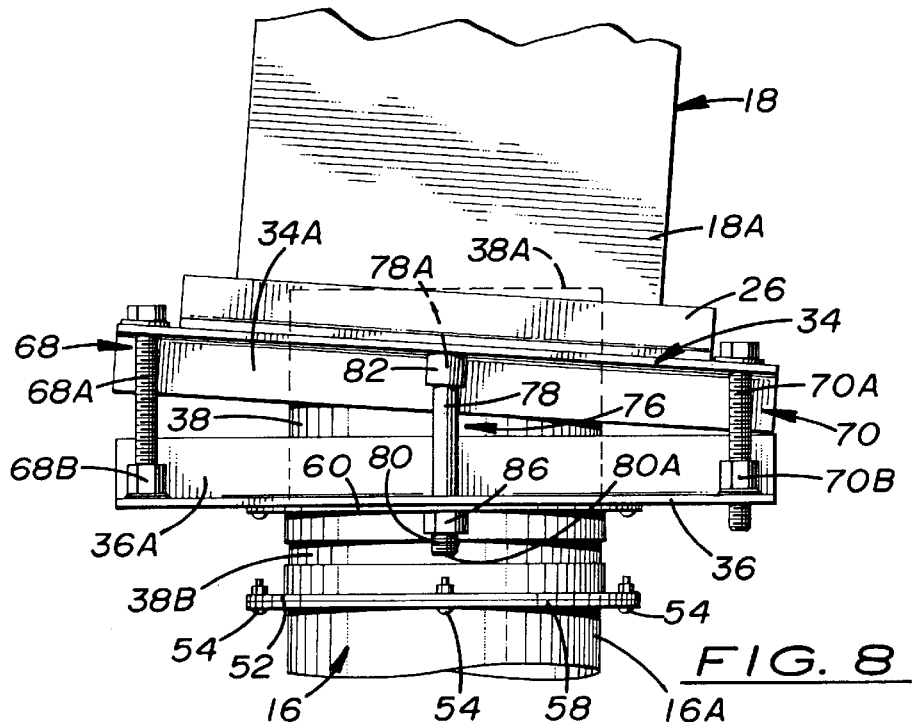
FIG. 8 is another front elevational view of the unit similar to that of FIG. 7 but now showing the upper framework of the unit adjusted to a rightwardly tilted orientation relative to the lower framework of the unit so that the fill tube is canted to a right-of-center disposition.

FIG. 8 shows the upper framework 34 of the unit 32 adjusted to a rightwardly tilted orientation relative to the lower framework 36 of the unit 32 so that the fill tube 18 is canted to a right-of-center disposition. To adjust the upper framework 34 to the rightwardly tilted orientation of FIG. 8, the adjustment elements 68, 72 (with only the adjustment element 68 being seen in FIG. 8) between the front frame members 34A, 36A and adjacent to the left side frame members 34C, 34C of the upper and lower frameworks 34, 36 are adjusted so as to space the left side frame members 34C, 36C farther apart compared to the centered orientation of the upper and lower frameworks 34, 36 in FIG. 3 and the adjustment elements 70, 74 (with only the adjustment element 70 being seen in FIG. 8) between the front frame members 34A, 36A and adjacent to the right side frame members 34D, 36D of the upper and lower frameworks 34, 36 are adjusted so as to space the right side frame members 34D, 36D closer together compared to the centered orientation of the upper and lower frameworks 34, 36 in FIG. 3.

A major advantage of the above-described adjustment elements 68–74 is that all of the adjustments referred to above can be performed by an operator located on a platform 88 outside of the silo 10.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. An adjustable base unit for angularly adjusting the mounting disposition of a fill tube on a blower pipe of a silo filling apparatus, said unit comprising:
   (a) an upper framework defining an upper opening of said unit and adapted to be detachably attached to an outer inlet end of a fill tube of a silo filling apparatus such that said upper opening is disposed adjacent to and generally aligned with the outer inlet end of the fill tube;
   (b) a lower framework defining a lower opening of said unit and adapted to be detachably attached to an upper discharge end of a blower pipe of the silo filling apparatus such that said lower opening is disposed adjacent to and generally aligned with the upper discharge end of the blower pipe;
   (c) a connection sleeve fixedly attached to said lower framework and extending between and through said upper and lower openings of said upper and lower frameworks, said connection sleeve having an upper end portion adapted to be inserted into the outer inlet end of the fill tube and a lower end portion adapted to be attached to the upper discharge end of the blower pipe such that said connection sleeve provides flow communication between respective passageways of the blower pipe and fill tube for passage of ensilage from the blower pipe to the fill tube; and
   (d) a plurality of elements adjustably fastening said upper and lower frameworks to one another n a spaced apart relationship from one another such that by adjusting selected ones of said fastening elements said upper framework can be moved and spaced relative to said lower framework and thereby angularly tilted in and fastened at any one of a plurality of different orientations relative to said lower framework and to said connection sleeve attached therewith so as to correspondingly angularly adjust the mounting disposition of the fill tube on the blower pipe and thereby the position of the fill tube within the silo.

2. The unit as recited in claim 1, wherein said upper framework includes front and rear frame members and opposite side frame members extending between and rigidly connected to the front and rear frame members so as to provide said upper framework in a rectangular configuration and define said upper opening of said unit through said upper framework.

3. The unit as recited in claim 2, wherein said upper framework has holes defined spaced apart from one another and adjacent opposite ends of said front and rear frame members and fasteners inserted through said holes so as to detachably attach said upper framework to the outer inlet end of the fill tube such that said upper framework is disposed about the outer inlet end of the fill tube.

4. The unit as recited in claim 2, wherein said lower framework includes front and rear frame members and opposite side frame members extending between and rigidly connected to the front and rear frame members so as to provide said lower framework in a rectangular configuration and define said lower opening of said unit through said lower framework.

5. The unit as recited in claim 4, wherein said elements adjustably fasten said upper and lower frameworks to one another in a spaced-apart relationship adjacent respective opposite ends of said front and rear frame members of said upper and lower frameworks.

6. The unit as recited in claim 4, wherein said plurality of different orientations that said upper framework can be angularly tilted relative to said lower framework include forwardly, rearwardly, rightwardly and leftwardly tilted orientations relative to a centered orientation of said upper framework relative to said lower framework.

7. The unit as recited in claim 4, wherein said connection sleeve has a lower end portion adapted to be detachably attached to the upper discharge end of the blower pipe and to said lower framework and to extend between and through said upper and lower openings of said upper and lower frameworks, said connection sleeve also having an upper end portion adapted to be inserted into the outer inlet end of the fill tube such that said connection sleeve provides flow communication between the blower pipe and fill tube for passage of ensilage from the blower pipe to the fill tube.

8. The unit as recited in claim 7, wherein said lower end portion of said connection sleeve includes:

a lower annular flange attached about and extending outwardly from said lower end portion of said connection sleeve so as to detachably attach said connection sleeve to the upper discharge end of the blower pipe; and an upper annular flange spaced above said lower annular flange and attached about and extending outwardly from said lower end portion of said connection sleeve so as to detachably attach said connection sleeve to said lower framework.

9. The unit as recited in claim 4, wherein said lower framework also has a pair of brackets each connected to and extending between said front and rear frame members and disposed along and connected to a respective one of the opposite side frame members, said brackets having inner edges which face toward one another and have arcuate configurations.

10. The unit as recited in claim 9, wherein said connection sleeve has a cylindrical configuration which is complementary to said arcuate configurations of said inner edges of said brackets such that the upper end portion of said connection sleeve extends adjacent to and upwardly between said inner edges of said brackets and thus upwardly through said lower opening of said lower framework, said upper opening of said upper framework and into the outer inlet end of the fill tube.

11. The unit as recited in claim 4, wherein said plurality of elements include four adjustment elements located at opposite ends of said front and back frame members of said upper and lower frameworks.

12. The unit as recited in claim 11, further comprising a socket assembly located between said front frame members of said upper and lower frameworks which permits said upper framework to be pivoted at said socket assembly toward and away from said lower framework at said rear frame members thereof.

13. In a silo filling apparatus, the combination comprising:
   (a) a fill tube for positioning at an upper end of a silo so as to extend from an outer inlet end of said fill tube disposed adjacent to and above an upper discharge end of a blower pipe, being attached on and extending upwardly along a continuous side wall of the silo, and an inner discharge end of said fill tube disposed above a top of an interior storage chamber of the silo; and
   (b) an adjustable base unit interposed between the upper discharge end of the blower pipe and said outer inlet end of said fill tube for angularly adjusting the mounting disposition of said fill tube on the blower pipe, said adjustable base unit comprising:
      (i) an upper framework defining an upper opening of said unit and adapted to be detachably attached to said outer inlet end of said fill tube such that said upper opening is disposed adjacent to and generally aligned with said outer inlet end of said fill tube,
      (ii) a lower framework defining a lower opening of said unit and adapted to be detachably attached to the upper discharge end of the blower pipe such that said lower opening is disposed adjacent to and generally aligned with the upper discharge end of the blower pipe,
      (iii) a connection sleeve fixedly attached to said lower framework and extending between and through said upper and lower openings of said upper and lower frameworks, said connection sleeve having an upper end portion adapted to be inserted into said outer inlet end of said fill tube and a lower end portion adapted to be attached to the upper discharge end of the blower pipe such that said connection sleeve provides flow communication between respective passageways of the blower pipe and said fill tube for passage of ensilage from the blower pipe to said fill tube, and
      (iv) a plurality of elements adjustably fastening said upper and lower frameworks to one another in a spaced apart relationship from one another such that by adjusting selected ones of said fastening elements said upper framework can be moved and spaced relative to said lower framework and thereby angularly tilted in and fastened at any one of a plurality of different orientations relative to said lower framework and to said connection sleeve attached therewith so as to correspondingly angularly adjust the mounting disposition of said fill tube on the blower pipe and thereby the position of said fill tube within the silo.

14. The apparatus as recited in claim 13, wherein said upper framework includes front and rear frame members and opposite side frame members extending between and rigidly connected to the front and rear frame members so as to provide said upper framework in a rectangular configuration and define said upper opening of said unit through said upper framework.

15. The apparatus as recited in claim 14, wherein said lower framework includes front and rear frame members and opposite side frame members extending between and rigidly connected to the front and rear frame members so as to provide said lower framework in a rectangular configuration and define said lower opening of said unit through said lower framework.

16. The apparatus as recited in claim 15, wherein said elements adjustably fasten said upper and lower frameworks to one another in a spaced-apart relationship adjacent respective opposite ends of said front and rear frame members of said upper and lower frameworks.

17. The apparatus as recited in claim 15, wherein said plurality of different orientations that said upper framework can be angularly tilted relative to said lower framework include forwardly, rearwardly, rightwardly and leftwardly tilted orientations relative to a centered orientation of said upper framework relative to said lower framework.

18. The apparatus as recited in claim 15, wherein said connection sleeve has a lower end portion adapted to be detachably attached to the upper discharge end of the blower pipe and to said lower framework and to extend between and through said upper and lower openings of said upper and lower frameworks, said connection sleeve also has an upper end portion adapted to be inserted into said outer inlet end of said fill tube such that said connection sleeve provides flow communication between the blower pipe and said fill tube for passage of ensilage from the blower pipe to said fill tube.

19. The apparatus as recited in claim 18, wherein said lower end portion of said connection sleeve includes:
   a lower annular flange attached about and extending outwardly from said lower end portion of said connection sleeve so as to detachably attach said connection sleeve to the upper discharge end of the blower pipe; and
   an upper annular flange spaced above said lower annular flange and attached about and extending outwardly from said lower end portion of said connection sleeve so as to detachably attach said connection sleeve to said lower framework.

20. The apparatus as recited in claim 15, wherein said plurality of elements include four adjustment elements located at opposite ends of said front and back frame members of said upper and lower frameworks.

21. The apparatus as recited in claim 20, further comprising a socket assembly located between said front frame members of said upper and lower frameworks which permits said upper framework to be pivoted at said socket assembly toward and away from said lower framework at said rear frame members thereof.

* * * * *